Dec. 23, 1952     W. C. RITCHIE     2,622,550

PLANT SETTING IMPLEMENT

Filed Oct. 6, 1947

*Inventor:*
WILLIAM C. RITCHIE
By Francis E. Boyce
*Attorney*

Patented Dec. 23, 1952

2,622,550

UNITED STATES PATENT OFFICE 2,622,550

PLANT SETTING IMPLEMENT

William Crawford Ritchie, Haddington, Scotland

Application October 6, 1947, Serial No. 778,084
In Great Britain January 18, 1947

2 Claims. (Cl. 111—3)

This invention relates to implements for planting young plants, such as cabbage, sprouts, savoys, cauliflowers, broccoli, leeks, and like plants which require to be transplanted, and has reference to implements of the kind comprising a furrow-opener in advance of a mechanical plant-setting device, and furrow-closing means mounted on the implement frame, which is preferably adapted to be drawn by a tractor vehicle.

According to my invention, the mechanical plant-setting device comprises a pair of co-axial or substantially co-axial vertical discs of flexible material, means for rotating the discs about their central axis or axes, means for separating the discs during the rear part of their revolution, and means for holding the discs in resilient contact with each other during the forward part of their revolution. In consequence of this arrangement the discs, when viewed from above, present a convergent V formation, into the open part of which the plants may be deposited one by one with their roots upwards, the plants being received between the discs, which resiliently hold and carry them forwards and downwards until the roots are deposited in the previously formed furrow, whereupon the rearwardly diverging lower part of the discs releases the plant preparatory to covering of the roots in the furrow by the furrow-closing means.

The invention will be more readily understood by reference to the accompanying drawings which illustrate the preferred manner of carrying out the invention.

Figure 3:
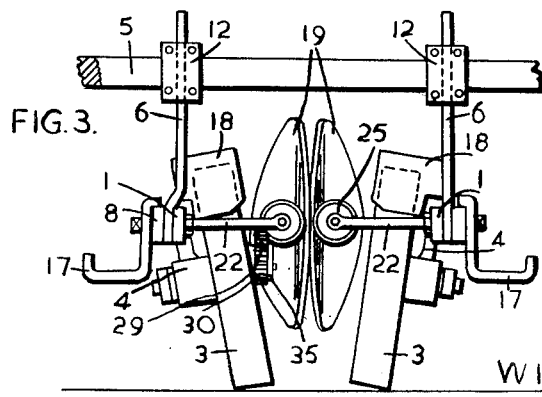
Fig. 3 is a front view of the implement.
Figure 4:
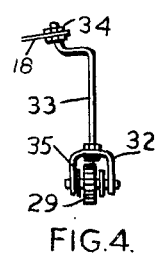
Fig. 4 is a detail view of an idler wheel suspension.

The implement comprises a pair of longitudinal members 1 connected together by cross members 2 to form a frame which is supported on a pair of skew wheels 3 mounted to rotate in bearings carried in brackets 4 secured to the members 1. The implement frame is adapted to be attached to a tractor tool bar 5. For this purpose, upright members or posts 6 are pivoted to the frame members 1 by means of bolts 7 and brackets 8 fixed to the members 1. A series of bolt holes 9 in the longitudinal members 1 enable the posts 6 to be adjusted rearwards on the implement frame in known manner. Chains 10 which connect the post to the members 1 lift the implement clear of the ground when the tool bar is raised. The posts 6 are adapted to be adjustably secured to the tractor tool bar 5, as by means of clamps 12. Also adjustably secured to the tool bar 5 by means of a clamp 13 is a post 14, the lower end of which carries a furrow opener 15 of any suitable construction. The furrow opener and post 14 are omitted from Fig. 3. Behind the wheels 3, the frame is fitted with a seat 16 on which the person in charge of the implement can sit while the implement is being drawn forward along the ground by the attachment of the tool bar 5 to an agricultural tractor. Foot rests 17 are provided on the members 1 for the feet of the sitter. Wheel guards 18 are provided over the wheels 3.

A mechanical plant-setting device is fitted between the furrow opener 15 and the wheels 3, this device consisting of a pair of rubber, e. g. sponge rubber, discs 19 secured upon an axle 20. The axle 20 is rotatably supported in the ends of shafts or rods 21 which extend rearwards from and are adjustably secured to the ends of cross arms 22 adjustably secured to the members 1. As shown, the arms 22 are screw-threaded and secured to the members 1 by adjusting nuts 23. Similarly, the shafts 21 are screw-threaded and secured to flattened ends of the arms 22 by means of adjusting nuts 24. Rollers 25 rotatable on the shafts 21 press the discs 19 together where they pass in front of the axle, and rollers 26 carried at the ends of a bracket 27 hold the rubber discs apart at the rear. The bracket 27 is adjustably secured to one of the frame cross members 2. The axle 20 carries a gear wheel 28 which meshes with an idle gear 29 in gear with a gear wheel 30 fixed on the axle 31 of one of the skew wheels 3, so that rotation of the wheels 3, as they run on the ground, rotates the rubber discs 19 in the same direction as the wheels 3. The idle gear wheel 29 may be supported in a fork 32 suspended from the lower end of a rod 33 secured by nuts 34 to one of the wheel guards 18. The spindles of the gear wheels are linked together by links 35 to maintain the gear wheels in engagement with each other.

Figure 1:
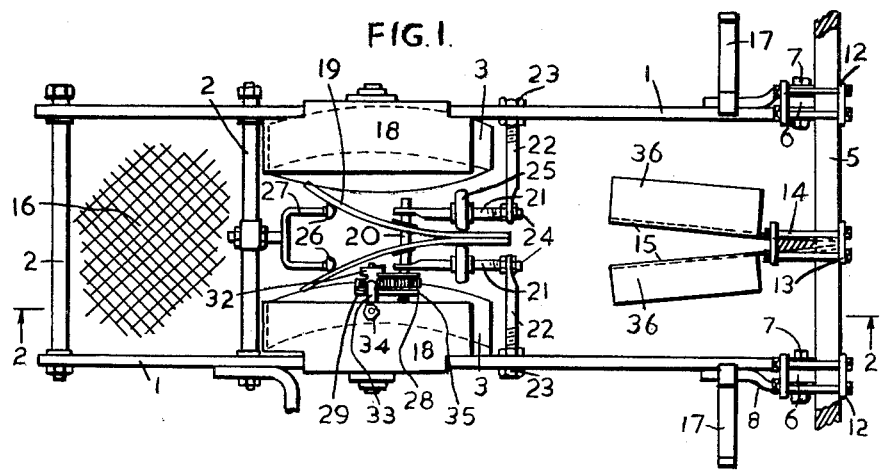
Fig. 1 is a plan view of the planting implement.
Figure 2:
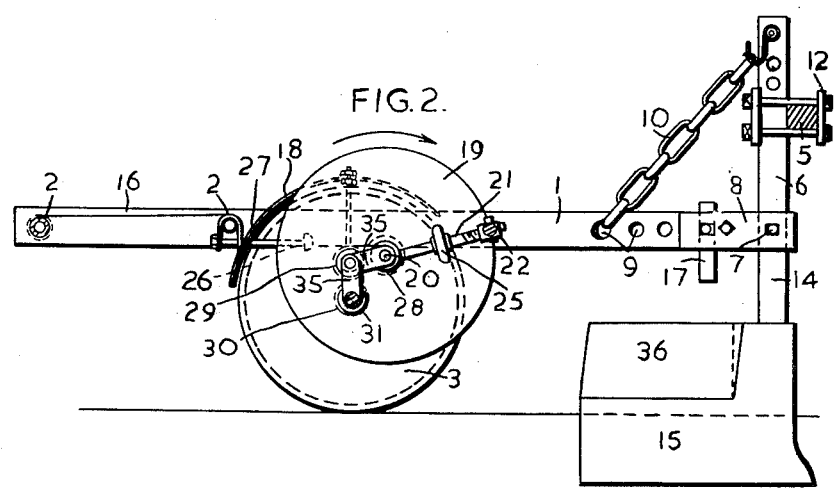
Fig. 2 is a side view taken in section on the line 2—2 of Fig. 1.

In operation the implement is drawn along the ground with an attendant sitting on the seat 16 behind the wheels 3. The furrow opener 15 makes a furrow in the land and the attendant places the plants between the discs 19 with the leaves of the plant downwards so that they are caught between the discs as the latter rotate in the direction of the arrow in Fig. 2. The plants are carried round by the upper part of the discs 19 and the leaves are gripped between the discs at the front where the discs are pressed together by the rollers 25. It will be understood that the roots and stems of the plants project beyond the periphery of the discs 19, and as the plants are carried downwards at the front of the discs, the roots are deposited in the furrow made by the furrow-opener 15. As the discs 19 gradually open apart over their lower portion, they release the leaves of the plant, leaving the plant upright in the furrow. The wheels 3 then press the soil around the roots of the plants, leaving them firmly embedded in the ground.

The attendant can regulate the spacing of the plants and the depth to which the roots are planted.

The pressure of the rollers 25 on the discs 19 can be varied by adjusting the length of the cross arms 22 by means of the nuts 23. Vertical adjustment of the discs 19 relatively to the skew wheels 3 can be effected by angularly adjusting the arms 22 in the frame members 1 and at the same time, if need be, increasing the effecting length of the rod 33 (by means of which the idle gear wheel 29 is suspended) by adjusting the nuts 34. Slight adjustment of the discs 19 forwards or backwards can also be effected by varying the length of the shafts 21 by adjustment of the nuts 24.

To assist in planting bent or straggly plants, a guide may be suspended from the implement frame between the furrow opener and the lower part of the discs 19. This guide may consist of a pair of plates 36 converging towards the front and mounted to travel above the level of the soil so as to guide the bent or straggly roots into the furrow. The plates 36 are shown welded to the upper edges of the furrow-opener 15 which is V-shaped in plan view, but they may be suspended in any suitable manner from the frame and otherwise shaped to guide the plants.

A number of implements similar to the implement shown in the drawings may be arranged side by side to be drawn by a single tractor draw bar, and the implements may also be arranged in gang formation and be drawn by a single tractor. In the latter case, one set of implements will work behind another set and the two sets will be staggered so that the rear implements travel behind the spaces between the front implements.

I claim:

1. A plant setting implement comprising a frame having side members and an end member, a pair of transverse arms extending inwardly in alignment with each other from the side members, a pair of shafts associated with said arms, one end of each shaft being adjustably carried by the inner end of its associated arm, the shafts extending in the same direction parallel to the side members, the free ends of the shafts carrying an axle transversely of the frame, positive drive means for rotating the axle, a pair of flexible discs spacedly mounted on the axle and rotated thereby, a roller rotatably mounted on each of the shafts intermediate the ends thereof, the rollers engaging the outer faces of the flexible discs to urge the inner faces of the discs into contact during a portion of the arc of rotation of the discs causing the inner faces of the discs to engage and hold a plant, the arms being adjustably mounted in the side members to transversely adjust the position of the rollers so that various sizes of plants may be held by the discs, the arms also being turnable on their axes with respect to the side members so that the axle may be moved on an arc to vary the height of the discs above the ground level, and a transverse brace mounted between the side members, a second set of rollers adjustably carried by the brace and engaging the inner faces of the discs during another portion of the arc of rotation of the discs to cause separation thereof so that the plant is released by the discs when in planting position.

2. A plant setting implement as set forth in claim 1 in which the drive means consists of a train of gears which also support the axle and the discs in adjusted position and one of the gears being adjustably supported from one of the side members so that the axle and discs are positively driven in any adjusted position.

WILLIAM CRAWFORD RITCHIE.

REFERENCES CITED

The following references are of record in the file of this patent:

UNITED STATES PATENTS

| Number | Name | Date |
| --- | --- | --- |
| 622,586 | Allison et al. | Apr. 4, 1899 |
| 1,888,143 | Poll | Nov. 15, 1932 |
| 1,924,133 | Schutmaat | Aug. 29, 1933 |
| 2,061,210 | Powell | Nov. 17, 1936 |
| 2,348,787 | Cordes | May 16, 1944 |
| 2,565,548 | Cordes | Aug. 28, 1951 |

FOREIGN PATENTS

| Number | Country | Date |
| --- | --- | --- |
| 557,603 | Great Britain | Nov. 26, 1943 |
| 895,779 | France | Apr. 11, 1944 |